United States Patent [19]

Edgerton et al.

[11] 4,121,190
[45] Oct. 17, 1978

[54] METHOD OF AND APPARATUS FOR SONAR DETECTION AND THE LIKE WITH PLURAL SUBSTANTIALLY ORTHOGONAL RADIATION BEAMS

[75] Inventors: Harold Eugene Edgerton, Cambridge; Charles W. Wyckoff, Needham, both of Mass.; Robert Harvey Rines, Concord, N.H.

[73] Assignee: The Academy of Applied Science, Inc., Boston, Mass.

[21] Appl. No.: 707,051

[22] Filed: Jul. 20, 1976

[51] Int. Cl.² .................... G01S 9/68; G01S 7/56
[52] U.S. Cl. .................... 340/3 R; 340/3 C; 340/3 F; 340/3 T
[58] Field of Search .............. 340/3 C, 3 R, 3 F, 3 T; 343/11 VB

[56] References Cited

U.S. PATENT DOCUMENTS

| | | | |
|---|---|---|---|
| 3,267,416 | 8/1966 | Morse | 340/3 F |
| 3,436,721 | 4/1969 | Farr | 340/3 D |
| 3,696,418 | 10/1972 | Litchford | 343/11 VB |
| 3,914,729 | 10/1975 | Sims et al. | 340/3 F |
| 4,003,015 | 1/1977 | Pipkin | 340/3 R |

*Primary Examiner*—Richard A. Farley
*Attorney, Agent, or Firm*—Rines and Rines, Shapiro and Shapiro

[57] ABSTRACT

This disclosure is concerned with employing substantially orthogonal transducer arrays with substantially complementary fan-shaped beams for pin-pointing underwater objects and the like.

18 Claims, 1 Drawing Figure

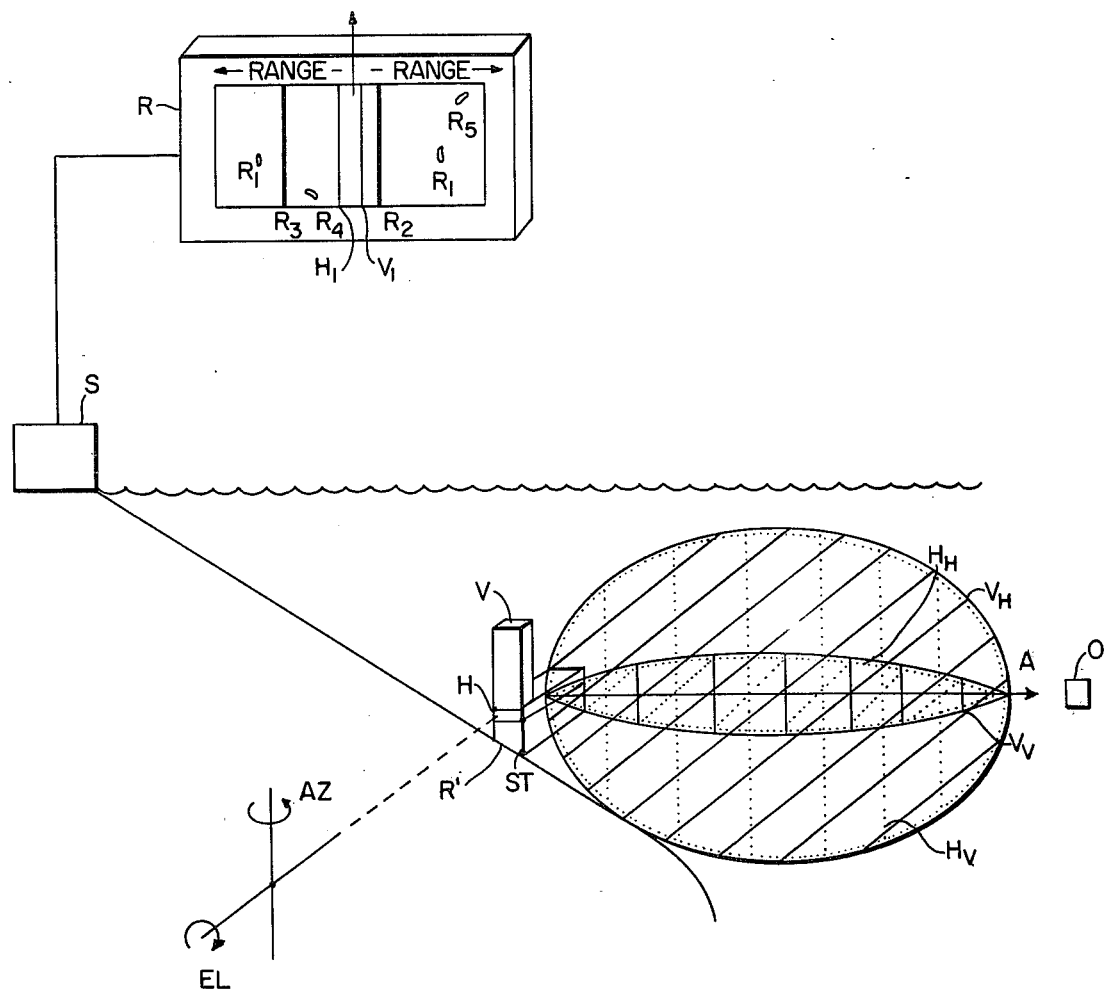

METHOD OF AND APPARATUS FOR SONAR DETECTION AND THE LIKE WITH PLURAL SUBSTANTIALLY ORTHOGONAL RADIATION BEAMS

The present invention relates to methods of and apparatus for sonar detection and the like, being more particularly directed to the pin-pointing of echoing objects underwater and the like, without the necessity for scanning, or phase-varied arrays requiring moving acoustic beams or patterns.

The art is replete with scanning techniques for the echo-location of objects (in space in the case of radar, and in water in the case of sonar) which work with various degrees of success in various applications or usages. Underwater operations, however, have numerous practical distinctions from radio location in air. While highly directional pencil-like acoustic beams of narrow angle in both horizontal and vertical planes or cross-sections can produce a localization of the echoing object, they inherently do not permit of wide angle searching and thus, even when scanned, are not highly reliable to find particular submerged objects. Wider-beamed radiation patterns, on the other hand, while broadening the angles of searching, introduce formidable ambiguities in pin-pointing actual position, though indicating range. The indicating of an echo on the sonar indicating means, such as a stylus or drum-recorder, then merely indicates the presence of an acoustically echoing object on a portion or section of a sphere of radius equal to the range of the object; but one cannot tell where the actual location of the object on such spherical surface may be. This is further complicated in the presence of echoing obstacles, including the bottom, the surface and vessels or other objects at or near the surface, including waves that make underwater echo-location quite unique. Unlike unwanted radar obstacles which do not exist in the sky, such unwanted underwater acoustically-echoing surfaces are invariably present; such that techniques that have worked for radar pin-pointing are not usually directly adaptable for sonar.

In addition, there are numerous applications where a simple, fixed acoustic transducer array is highly desirable, without complicated phasing or mechanical scanning mechanisms, and where continual discriminating pin-pointing of the echoing object is essential.

Sonar beams directional in one plane and relatively broad in the orthogonal plane and other shaped beams have also been employed for numerous applications, such as bottom and side-scan detection and profiling as described in "Underwater Search At Loch Ness", M. Klein, Academy of Applied Science Monograph 1, 1972 and by the co-inventors hereof in "Search for the Loch Ness Monster", M.I.T. Technology Review, Mar-April, 1976, pp. 25–40; but again, while one angular plane coordinate can be determined with the narrow beam cross-section, ambiguity in the orthogonal plane angle persists.

It is to this problem, accordingly, that the present invention, in one of its important usages, is directed; it being an object to provide a new and improved acoustic or sonar detection method and apparatus that is not subject to the above disadvantages but that, to the contrary, enables the fixing of the precise three-dimensional position of an object in addition to its range determination, and without requiring scanning.

A further object is to provide such a novel method and apparatus of more general utility, as well.

Other and further objects will be explained hereinafter and are more particularly delineated in the appended claims. In summary, from one of its broadest aspects, the invention embraces a method of sonar location and the like, that comprises, transmitting and receiving sonar energy in a fan-shaped acoustic beam along a predetermined axis underwater from a predetermined location, the beam having a narrow beam angle in one plane and a relatively wide beam angle in a substantially orthogonal plane, to provide wide-angle echo-detection in the orthogonal plane with narrow-angle discrimination in the said one plane; substantially simultaneously transmitting and receiving sonar energy in a further fan-shaped acoustic beam substantially along said axis underwater from substantially the same location, said further beam having a narrow beam angle in the said orthogonal plane and a relatively wide beam angle in the said one plane, to enable wide-angle echo-detection in the said one plane with narrow-angle discrimination in the said orthogonal plane; simultaneously displaying the received echo signals of both beams; and indicating when an echo signal is displayed from both beams at precisely the same range, then to pin-point the position of the echoing objects as directly along said axis and at said range. Preferred details are hereinafter detailed.

The invention will now be described with reference to the accompanying drawing, the single figure of which is a diagram illustrating the invention in preferred form.

For purposes of illustration, the invention is illustrated as applied to a fixed underwater location, as on a deep ridge R', to detect the passage of moving underwater objects O that are to be detected when crossing a predetermined axis A, which may, for example, be directed at underwater cameras, (not shown) intended to photograph such objects O during such passage, as described in the said M.I.T. Technology Review article. Clearly, other applications and usages will be evident, including even towing or moving the apparatus, as a unit, if desired. While, moreover, operation with acoustic energy underwater is described, the invention may be used with other energy beams wherever the purposes achieved by the invention are desired.

In accordance with the invention, a long substantially horizontally oriented transducer array H is shown mounted on a stand ST on the bottom ridge R', with its resulting narrow beam angle $H_H$ in the long-dimension horizontal plane, and its relatively wide beam angle $H_V$ in the vertical plane (resulting from its narrow dimension width), producing a fan-shaped vertical "fence". Moving objects O may pass through this beam "fence" into and out of the plane of the drawing, echoing the transmitted sonar impulses generated by sonar apparatus S back to the receiver thereof in conventional fashion as described, for example, in the above references and as is well known. Simultaneously, the sonar apparatus S is shown energizing a preferably similar vertically oriented transducer array V, also mounted at or near the stand ST, to produce a similar fan-shaped beam, but oriented complementarily to the beam $H_H$-$H_V$, with the narrow discriminating beam angle in the vertical plane at $V_V$, and the wider angle beam cross-section $V_H$ in the horizontal plane; but with its fan-shaped substantially horizontal beam "fence" directed along substantially the same axis A as the beam $H_H$-$H_V$ of transducer array H. While the arrays H and V need not be precisely of the same energy coverages for uses as in the above illustrative example, they are preferably similar and of common frequency and sonar pulse recurrence frequency.

Fixed echoes, as from bottom obstacles or the like, will be recorded on the conventional sonar stylus or drum chart recorder R (or other display), moving with time in the direction of the arrow, as vertical lines parallel to the transmitted pulse origin lines $H_1$ and $V_1$, of the respective transducers H and V, and horizontal distances (such as $R_3$ and $R_2$) corresponding to the ranges of these objects detected by transducers H and V, respectively. In this case, the object producing echo line $R_3$ is outside the fan beam $V_H$-$V_V$, but within the fan beam $H_H$-$H_V$; and vice versa for echo line $R_2$. Stationary echoing objects produce steady lines along the direction of time movement of the chart or other display. Similarly, fish or other moving echoing objects are indicated at $R_4$ on the display for transducer H and at $R_5$ for the time-moving display of echo signals from transducer V; again with the objects producing such echoes only with their respective beams and diagonally indicated if receding or approaching with, thus, positive discrimination of moving targets; transient or intermittent traces in the direction of time movement of the chart also indicating relatively transversely moving objects. But when an object such as $R_1$ is in both fan-shaped beams, there is a simultaneous display of the echo from such common object O on both displays, pin-pointing the subject as simultaneously within both complementary, intersecting fan-shaped beams $H_H$-$H_V$ and $V_H$-$V_V$ and thus along the axis A and at range $R_1$. Thus, accurate localization has been achieved without the necessity for scanning arrays and the like of the prior art, and with the flexibility of wide-angle searching in both planes, all the while.

If desired, the left-hand display $H_1$ may be inverted to overlay the right-hand display $V_1$, as by mirror projection or other well-known techniques, such that the coincidence of echoes $R_1$ will be readily indicated; or ther correlation techniques and apparatus may be used, as is well-known.

Through this technique, moreover, unlike prior art, large-area scanning and searching operations, simple rotational movements azimuthally and in elevation enable pin-pointing with minimal searching. Thus, particularly in other searching applications, for example, movement in the horizontal plane of the vertical fan beam $H_H$-$H_V$ to find a target in azimuth, illustrated schematically by the rotator axis AZ normal to the horizontal plane, and then movement in the vertical plane of the horizontal fan beam $V_H$-$V_V$ to locate it elevationally, as at the horizontal axis EL, or visa versa, provides a quick, simple and reliable fix. As shown, both fan beams are of similar energy coverage and pattern and move in unison as a single unit, both azimuthally and elevationally, though this is not always necessary, with independent adjustment being sometimes useful and somewhat differing beam coverage or shaping also having application for special circumstances. For the purposes of the illustrated embodiment, however, similar beams and unison movement are particularly beneficial.

A further feature of the technique of the invention resides in the additional refinement that the gain or sensitivity of the sonar reception of the different fan-shaped beams can be selectively and separately or independently varied during display. It may be desirable, as an illustration, to operate the reception and display of the horizontal fan beam signals with relatively high sensitivity to search for extreme ranges as well as the closer-range objects; while operating the vertical fan beam signal gain with lower sensitivity to concentrate on the closer-range objects. An indication or comparison of the relative size of vertical and horizontal dimensions or extent of an echoing object may also be obtained by selectively reducing the horizontal and vertical fan reception gains while displaying the signal from a common object.

While two substantially orthogonal intersecting fan-shaped beams have been described, there are applications where such intersecting relationship need not be strictly orthogonal or with horizontal and vertical orientation (such terms thus being used generically as reference directions herein, though actual substantially horizontal and vertical directions are preferred for the illustrative application), and clearly ancillary fan-shaped beams at intermediate intersecting angles may be added, with appropriate additional corresponding displays, if desired. The illustrated embodiment, however, is particularly tailored for many types of underwater applications. The use of somewhat different frequencies for the beams H and V can, among other features, help prevent interference or cross-talk on the displays, and different pulse recurrence frequencies can enable different range limits which can also be correlated in the display in monitoring for common objects in the beams.

In tests at Lock Ness, Scotland, such a system was successfully employed for object localization, as shown, with arrays H and V each about 35 cm. long and about 2 cm. wide, operating at about 105 KHZ, with 0.1 millisecond sonar pulses, and with narrow beam angles of about 1.0° three dB down, and fan beam angle about 40° three dB down. The sonar transmitter-receiver-recorder display systems S-R was an E G & G Model 259-3 side-scan apparatus. The system H-V was connected as a unitary structure, in a cradle stand ST, orientable as a unit along the arcuate directions EL, and in azimuth AZ with the stand.

While the above system configuration is preferred, further modifications will also occur to those skilled in this art, such being considered to fall within the spirit and scope of the invention as defined in the appended claims.

What is claimed is:

1. A method of sonar location and the like, that comprises, transmitting and receiving sonar energy in a fan-shaped acoustic beam along a predetermined axis underwater from a predetermined location, the beam having a narrow beam angle in one plane and a relatively wide beam angle in a substantially orthogonal plane, to provide wide-angle echo-detection in the orthogonal plane with narrow-angle discrimination in the said one plane; substantially simultaneously transmitting and receiving sonar energy in a further fan-shaped acoustic beam substantially along said axis underwater from substantially the same location, said further beam having a narrow beam angle in the said orthogonal plane and a relatively wide beam angle in the said one plane, to enable wide-angle echo-discrimination in the said one plane with narrow-angle discrimination in the said orthogonal plane; simultaneously displaying the received echo signals of both beams; and indicating when an echo signal is displayed from both beams at precisely the same range, thus to pin-point the position of the echoing objects as directly along said axis and at said range.

2. A method as claimed in claim 1 and in which said location is fixed underwater and said objects move through said beams.

3. A method as claimed in claim 1 and in which said location is moved in the water.

4. A method as claimed in claim 1 and in which said one plane is substantially horizontal and said orthogonal plane, substantially vertical.

5. A method as claimed in claim 1 and in which the values of the respective narrow and wide beam angles are substantially the same in each fan-shaped beam.

6. A method as claimed in claim 1 and in which the beams are of substantially similar energy coverage.

7. A method as claimed in claim 6 and in which the sonar energy of each beam is provided simultaneously from a common pulsing source.

8. A method as claimed in claim 1 and in which the said beams are moved about an axis normal to said one plane to indicate an object in the first named beam, and the said beams are moved about an axis normal to said orthogonal plane simultaneously to indicate the same object in said further beam.

9. A method as claimed in claim 8 and in which the said beams are moved in unison.

10. A method as claimed in claim 1 and in which said predetermined location is underwater proximal to the bottom.

11. A method as claimed in claim 1 and in which the reception and displaying of echo signals received in the two fan-shaped beams is effected with differing relative sensitivities.

12. A method as claimed in claim 11 and in which the said sensitivities of the two fan-shaped beams are independently changed during the displaying of the echo signals.

13. A method as claimed in claim 1 and in which the said predetermined location is relatively stationary with reference to said objects and said displaying is effected on a time-moving surface along a predetermined direction to discriminate relatively moving from stationary objects by indications extending diagonally to said direction and by transient indications along said direction.

14. A method as claimed in claim 1 and in which at least one of the frequency and the sonar pulse recurrence frequency of the sonar energy of the fan-shaped beams are adjusted to be somewhat different.

15. A method as claimed in claim 1 and in which the frequency and sonar pulse recurrence frequency of the sonar energy of the fan-shaped beams are adjusted to be substantially the same.

16. Sonar location apparatus having, in combination, a pair of substantially orthogonally mounted acoustic transducer means each having a long and a narrow dimension for respectively producing a narrow beam angle in the plane of the long dimension and a relatively wide fan-shaped beam angle in the substantially orthogonal plane of the narrow dimension, with the narrow beam angles of each transducer means substantially orthogonal to each other; sonar transmitting and receiving means connected with the pair of transducer means to transmit and receive their respective beams along substantially the same axis simultaneously; means for substantially simultaneously displaying the received echo signals of both beams; and means for indicating when an echo-signal is displayed on the last-named means from both beams at precisely the same range, thereby to pin-point the position of the echoing object as directly along said axis at said range.

17. Sonar location apparatus as claimed in claim 16 and in which the pair of transducer means are connected to move angularly in unison.

18. Sonar location apparatus as claimed in claim 16 and in which the pair of transducer means are of similar dimensions to produce similar, though complementary, beams.

* * * * *